(12) United States Patent
Skalecki et al.

(10) Patent No.: US 12,261,772 B2
(45) Date of Patent: Mar. 25, 2025

(54) VARIABLE PREEMPTION FOR LSP TUNNELS

(71) Applicant: Ciena Corporation, Hanover, MD (US)

(72) Inventors: Darek Skalecki, Ottawa (CA); Gerald Smallegange, Stittsville (CA); Himanshu Shah, Hopkinton, MA (US)

(73) Assignee: Ciena Corporation, Hanover, MD (US)

( * ) Notice: Subject to any disclaimer, the term of this patent is extended or adjusted under 35 U.S.C. 154(b) by 4 days.

(21) Appl. No.: 18/337,392

(22) Filed: Jun. 19, 2023

(65) Prior Publication Data

US 2024/0089200 A1 Mar. 14, 2024

Related U.S. Application Data

(60) Provisional application No. 63/405,662, filed on Sep. 12, 2022.

(51) Int. Cl.
*G06F 13/00* (2006.01)
*H04L 45/28* (2022.01)
*H04L 45/50* (2022.01)
*H04L 47/80* (2022.01)

(52) U.S. Cl.
CPC .............. *H04L 45/50* (2013.01); *H04L 45/28* (2013.01); *H04L 47/803* (2013.01)

(58) Field of Classification Search
CPC ........ H04L 45/50; H04L 45/28; H04L 47/803
USPC ......................................... 709/238, 239, 240
See application file for complete search history.

(56) References Cited

U.S. PATENT DOCUMENTS

| | | |
|---|---|---|
| 5,848,055 A | 12/1998 | Fedyk et al. |
| 6,195,354 B1 | 2/2001 | Skalecki et al. |
| 6,330,614 B1 | 12/2001 | Aggarwal et al. |
| 6,873,616 B1 | 3/2005 | Fedyk et al. |
| 6,914,912 B1 | 7/2005 | Skalecki et al. |
| 7,304,947 B2 | 12/2007 | Skalecki et al. |
| 7,430,176 B2 | 9/2008 | Nalawade et al. |
| 7,525,907 B2 | 4/2009 | Skalecki et al. |
| 7,532,631 B2 | 5/2009 | Raszuk et al. |

(Continued)

FOREIGN PATENT DOCUMENTS

| | | |
|---|---|---|
| EP | 1422888 A1 | 5/2004 |
| EP | 1326371 B1 | 7/2006 |

(Continued)

OTHER PUBLICATIONS

RFC 3209; D. Awduche et al.; pp. 1-53 (Year: 2001).*

*Primary Examiner* — Kenneth R Coulter
(74) *Attorney, Agent, or Firm* — Baratta Law PLLC; Lawrence A. Baratta, Jr.

(57) ABSTRACT

Variable preemption for label-switched paths (LSP) tunnels includes provisioning a label-switched path (LSP) tunnel at a first bandwidth with a first priority value; and provisioning one or more different priority values at one or more of (1) corresponding one or more bandwidths such that a current priority value of the LSP tunnel is set based on a current bandwidth value of the LSP tunnel and (2) redial failure attempts such that the current priority value of the LSP tunnel is set based on a number of the redial failure attempts. The priority values can include one of a Setup Priority, a Holding Priority, and a combination thereof. The one of the Setup Priority, the Holding Priority, and the combination thereof can be based on RFC 3209.

18 Claims, 9 Drawing Sheets

(56) References Cited

U.S. PATENT DOCUMENTS

| | | | |
|---|---|---|---|
| 7,590,051 B1 | 9/2009 | Skalecki et al. | |
| 7,639,631 B2 | 12/2009 | Ashwood-Smith et al. | |
| 7,756,009 B1 | 7/2010 | De Boer et al. | |
| 7,995,569 B2 | 8/2011 | Ashwood-Smith et al. | |
| 8,085,676 B2 | 12/2011 | Skalecki et al. | |
| 8,116,232 B2 | 2/2012 | Skalecki et al. | |
| 8,116,308 B2 | 2/2012 | Ellis et al. | |
| 8,189,482 B2 * | 5/2012 | Vasseur | H04L 45/12 370/248 |
| 8,259,590 B2 | 9/2012 | Shah et al. | |
| 8,295,278 B2 | 10/2012 | Shah et al. | |
| 8,402,121 B2 | 3/2013 | Skalecki et al. | |
| 8,504,727 B2 | 8/2013 | Mohan et al. | |
| 8,553,707 B2 | 10/2013 | Swinkels et al. | |
| 8,560,708 B2 | 10/2013 | Nelakonda et al. | |
| 8,750,141 B2 | 6/2014 | Skalecki et al. | |
| 8,817,798 B2 | 8/2014 | Skalecki et al. | |
| 8,855,071 B1 | 10/2014 | Sankaran et al. | |
| 9,118,421 B2 | 8/2015 | Swinkels et al. | |
| 9,118,605 B2 | 8/2015 | Skalecki et al. | |
| 9,124,960 B2 | 9/2015 | Swinkels et al. | |
| 9,191,280 B2 | 11/2015 | Swinkels et al. | |
| 9,197,493 B2 | 11/2015 | Holness et al. | |
| 9,467,478 B1 | 10/2016 | Khan et al. | |
| 9,509,593 B2 | 11/2016 | Sharma et al. | |
| 9,608,719 B2 | 3/2017 | Skalecki et al. | |
| 9,800,325 B1 | 10/2017 | Skalecki et al. | |
| 9,876,865 B1 * | 1/2018 | Skalecki | H04L 67/51 |
| 10,142,254 B1 | 11/2018 | Olofsson et al. | |
| 10,284,661 B2 * | 5/2019 | Skalecki | H04L 41/0668 |
| 10,341,258 B2 | 7/2019 | Sareen et al. | |
| 10,355,935 B2 | 7/2019 | Skalecki | |
| 10,397,102 B2 | 8/2019 | Khan et al. | |
| 10,484,764 B2 * | 11/2019 | Vanderydt | H04J 14/08 |
| 10,541,923 B2 | 1/2020 | Skalecki et al. | |
| 10,740,408 B2 | 8/2020 | Ramasamy et al. | |
| 10,764,659 B2 * | 9/2020 | Vanderydt | H04J 3/1652 |
| 11,102,109 B1 | 8/2021 | Narasimhan et al. | |
| 11,184,276 B1 | 11/2021 | Boutros et al. | |
| 11,271,854 B2 | 3/2022 | Yadav et al. | |
| 2003/0016808 A1 | 1/2003 | Hu et al. | |
| 2005/0198312 A1 | 9/2005 | Ashwood-Smith et al. | |
| 2007/0268817 A1 | 11/2007 | Smallegange et al. | |
| 2008/0002680 A1 | 1/2008 | Skalecki et al. | |
| 2008/0198755 A1 * | 8/2008 | Vasseur | H04L 47/825 370/248 |
| 2008/0219276 A1 | 9/2008 | Shah et al. | |
| 2008/0273472 A1 | 11/2008 | Bashford et al. | |
| 2008/0281987 A1 | 11/2008 | Skalecki et al. | |
| 2011/0219128 A1 | 9/2011 | Swinkels et al. | |
| 2012/0082089 A1 | 4/2012 | Nelakonda et al. | |
| 2016/0191324 A1 | 6/2016 | Olofsson et al. | |
| 2018/0013613 A1 | 1/2018 | Skalecki et al. | |
| 2018/0131776 A1 | 5/2018 | Skalecki et al. | |
| 2018/0262421 A1 | 9/2018 | Skalecki et al. | |
| 2018/0331946 A1 | 11/2018 | Olofsson et al. | |
| 2019/0208296 A1 * | 7/2019 | Vanderydt | H04L 69/18 |
| 2020/0036686 A1 | 1/2020 | Olofsson et al. | |
| 2020/0220811 A1 | 7/2020 | Shah et al. | |
| 2020/0358681 A1 | 11/2020 | Shah et al. | |
| 2021/0243095 A1 | 8/2021 | Attarwala et al. | |
| 2021/0328905 A1 | 10/2021 | Skalecki | |
| 2021/0352011 A1 | 11/2021 | Boutros et al. | |
| 2022/0046383 A1 | 2/2022 | Nagori et al. | |
| 2022/0052964 A1 | 2/2022 | Bhardwaj et al. | |
| 2022/0078074 A1 | 3/2022 | Shah et al. | |
| 2022/0094635 A1 | 3/2022 | Ramsland et al. | |
| 2022/0131721 A1 | 4/2022 | Boutros et al. | |
| 2022/0368629 A1 | 11/2022 | Shah et al. | |
| 2022/0407798 A1 | 12/2022 | Holness et al. | |

FOREIGN PATENT DOCUMENTS

| | | |
|---|---|---|
| EP | 1735951 B1 | 5/2017 |
| EP | 3813310 A1 | 4/2021 |

\* cited by examiner

VARIABLE PREEMPTION FOR LSP TUNNELS

CROSS-REFERENCE TO RELATED APPLICATION(S)

The present disclosure claims priority to U.S. Patent Application No. 63/405,662, filed Sep. 12, 2022, the contents of which are incorporated by reference in their entirety.

FIELD OF THE DISCLOSURE

The present disclosure relates generally to networking. More particularly, the present disclosure relates to systems and methods for variable preemption for label-switched paths (LSP) tunnels.

BACKGROUND OF THE DISCLOSURE

Resource reservation protocol-traffic engineering (RSVP-TE) is an extension of the resource reservation protocol (RSVP) for traffic engineering. It supports the reservation of resources across an Internet Protocol (IP) network. RFC 3209, "RSVP-TE: Extensions to RSVP for LSP Tunnels," December 2001, the contents of which are incorporated by reference in their entirety, describes the use of RSVP including all the necessary extensions, to establish LSPs in multi-protocol label switching (MPLS). Since the flow along an LSP is completely identified by the label applied at the ingress node of the path, these paths may be treated as tunnels. LSP tunnels are advantageous to network operators as they can overprovision network resources while guaranteeing service quality.

BRIEF SUMMARY OF THE DISCLOSURE

The present disclosure relates to systems and methods for variable preemption for label-switched paths (LSP) tunnels. One aspect of LSP tunnels is preemption based on setup and hold priority (as defined in RFC 3209). These values are static across all states of a given LSP and there are situations where there is a need for a variable preemption priority. Specifically, as tunnels increase in size, it becomes harder and harder to find suitable paths as part of a reroute, redial, or make-before break (MBB). This situation is further exacerbated by large tunnel sizes such as greater than 100 Gb/s. Of note, the present disclosure allows LSP tunnels to have different priority values (i.e., setup and/or holding priority) based on a current bandwidth value, with the objective that higher bandwidth leads to higher priority such that a given LSP tunnel will be able to get a path on higher bandwidth links. The links can be in an underlay network, such as an optical network. For example, a 100G+ LSP tunnel will have less options for paths in an optical network having 100G links than in 200G+ links. The objective is to allow the LSP tunnel to preempt smaller (i.e., with lower bandwidth requirements) LSP tunnels on the larger (i.e., with higher bandwidth capacity) links.

The present disclosure includes automatically/dynamically adjusting a tunnel's setup and/or holding priority as it grows and shrinks in size, including defining the thresholds for such adjustment.

In various embodiments, the present disclosure can include a method having steps, an apparatus with one or more processors configured to implement the steps, and a non-transitory computer-readable medium with instructions that, when executed, cause at least one processor to perform the steps. The steps include provisioning a label-switched path (LSP) tunnel at a first bandwidth with a first priority value; and provisioning one or more different priority values at one or more of (1) corresponding one or more bandwidths such that a current priority value of the LSP tunnel is set based on a current bandwidth value of the LSP tunnel and (2) redial failure attempts such that the current priority value of the LSP tunnel is set based on a number of a redial attempt.

The priority values can include one of a Setup Priority, a Holding Priority, and a combination thereof. The one of the Setup Priority, the Holding Priority, and the combination thereof can be based on RFC 3209. The corresponding one or more bandwidths can be based on a threshold of bandwidth. The steps can further include operating the LSP at the first priority value based on the first bandwidth; auto-sizing the LSP based on monitored usage; and changing the first priority value due to the auto-sizing, to a second priority value. The steps can further include preempting other LSP tunnels or preventing preemption by the other LSPs based on the second priority value.

The current bandwidth value can cause a setting to a higher priority value for a higher bandwidth value, thereby allowing the LSP tunnel to preempt lower priority LSP tunnels. The current bandwidth value includes different Upgrade and Downgrade thresholds to control oscillations. The LSP tunnel can be configured over an underlay network comprising one of an optical network, an optical transport network (OTN), a segment routing (SR) network, and a combinations thereof. The current priority value of the LSP tunnel can be set based on bandwidth on given links in the underlay network.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
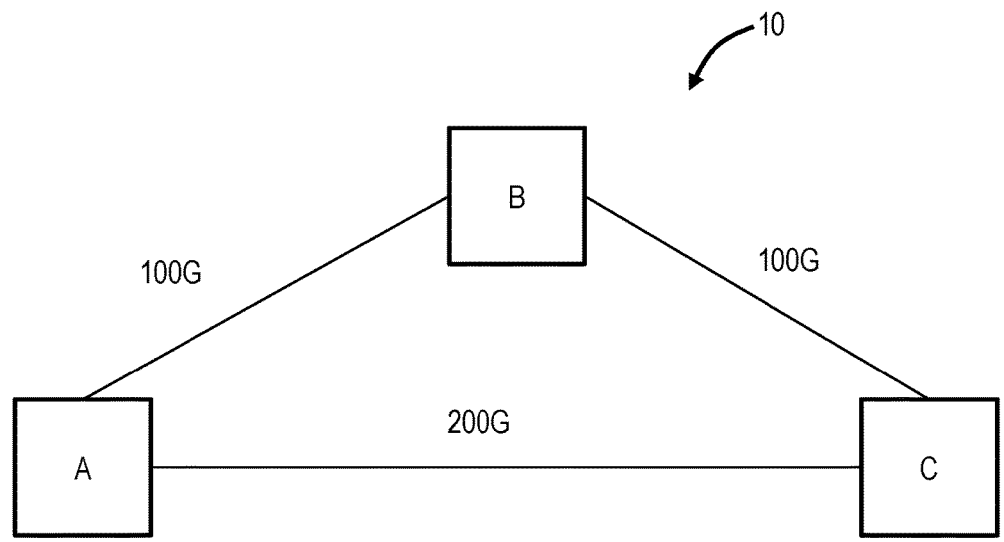
FIGS. 1-9 are network diagrams of an example MPLS network illustrating LSP tunnel operation over time as various tunnels resize, reroute, redial, and/or perform MBB.

Again, the present disclosure relates to systems and methods for variable preemption for label-switched paths (LSP) tunnels. One aspect of LSP tunnels is preemption based on setup and hold priority (as defined in RFC 3209). These values are static across all states of a given LSP and there are situations where there is a need for a variable preemption priority. Specifically, as tunnels increase in size, it becomes harder and harder to find suitable paths as part of a reroute, redial, or make-before break (MBB). This situation is further exacerbated by large tunnel sizes such as greater than 100 Gb/s. Of note, the present disclosure allows LSP tunnels to have different priority values (i.e., setup and/or holding priority) based on a current bandwidth value, with the objective that higher bandwidth leads to higher priority such that a given LSP tunnel will be able to get a path on higher bandwidth links. The links can be in an underlay network, such as an optical network. For example, a 100G+ LSP tunnel will have less options for paths in an optical network having 100G links than in 200G+ links. The objective is to allow the LSP tunnel to preempt smaller LSP tunnels on the larger links.

The present disclosure includes automatically/dynamically adjusting a tunnel's setup and/or holding priority as it grows and shrinks in size, including defining the thresholds for such adjustment.

LSP Tunnels

RFC 3209 defines "LSPs in MPLS networks." Since the traffic that flows along an LSP is defined by the label applied at the ingress node of the LSP, these paths can be treated as tunnels, tunneling below normal Internet Protocol (IP) routing and filtering mechanisms. When an LSP is used in this way we refer to it as an LSP tunnel. LSP tunnels allow the implementation of a variety of policies related to network performance optimization. For example, LSP tunnels can be automatically or manually routed away from network failures, congestion, and bottlenecks. Furthermore, multiple parallel LSP tunnels can be established between two nodes, and traffic between the two nodes can be mapped onto the LSP tunnels according to local policy. Although traffic engineering (that is, performance optimization of operational networks) is expected to be an important application of this specification, the extended RSVP protocol can be used in a much wider context. The purpose of RFC 3209 is to describe the use of RSVP to establish LSP tunnels. The intent is to fully describe all the objects, packet formats, and procedures required to realize interoperable implementations.

Preemption

Preemption describes the process where one LSP tunnel forces another LSP tunnel, i.e., lower priority relative to the one LSP tunnel at a higher priority, to move. Preemption is implemented by two priorities. The Setup Priority is the priority for taking resources. The Holding Priority is the priority for holding a resource. Specifically, the Holding Priority is the priority at which resources assigned to this session will be reserved. The Setup Priority SHOULD never be higher than the Holding Priority for a given session.

LSP tunnels are signaled from a head end node (network element) with a Setup and Hold priority. Setup priority is the priority of the session with respect to taking resources, in the range of 0 to 7. The value 0 is the highest priority. The Setup priority is used in deciding whether this session can preempt another session. Holding priority is the priority of the session with respect to holding resources, in the range of 0 to 7. The value 0 is the highest priority. Holding Priority is used in deciding whether this session can be preempted by another session. As described herein, "higher priority" means more important and not necessarily numerically higher. Of note, "higher priority" means "lower priority value", e.g.: Setup Priority=4 is actually higher than Setup Priority=5.

When a PATH message is threaded through the intermediate hops, each node compares the incoming Setup Priority against the Holding Priority of the existing LSPs. If there is resource contention, higher incoming setup priority LSP will be favored and lower hold priority existing LSP(s) are pre-empted (soft or hard) and resources are relinquished to the incoming LSP. In this manner, a network operator can oversubscribe the resources. Note, as is known in the art, the terms LSP, tunnel, LSP tunnel, etc. are all meant to denote the same thing.

Variable Preemption Priority

The Setup Priority and Holding Priority values are static across all states of a given LSP, conventionally and in RFC 3209, and there are situations where there is a need for a variable preemption priority. As defined herein, variable preemption priority means different values for the Setup Priority and Holding Priority values based on different characteristics of the LSP tunnel, i.e., tunnel size. Specifically, as tunnels increase its size, it becomes harder and harder to find suitable paths as part of a reroute, redial, or make-before break (MBB). This situation is further exacerbated by large tunnel sizes such as greater than 100 Gb/s (note, as described herein a number with G means X Gb/s, i.e., 100G is 100 Gb/s, this is just a shorthand). The present disclosure allows LSP tunnels to have different priority values (i.e., Setup and/or Holding Priority) based on a current bandwidth value, with the objective that higher bandwidth leads to higher priority such that a given LSP tunnel will be able to get a path on higher bandwidth links. The links can be in an underlay network, such as an optical network. For example, a 100G+ LSP tunnel will have less options for paths in an optical network having 100G links than in 200G+ links.

That is, as tunnels increase in size, it becomes harder and harder to find suitable paths for such tunnels as part of reroute/redial or MBB (Auto-Size/Up Size, global reversion (GRev), etc.). For example, network operators are building out networks with higher capacity links (e.g., from 100 Gb/s to 400 Gb/s and more). Also, there is a desire to build higher bandwidth LSPs, e.g., greater than 100 Gb/s or even higher. Of note, even though the network operators are building higher bandwidth links (e.g., 400 Gb/s), there can still be a significant number of lower bandwidth links (e.g., 100 Gb/s). An LSP tunnel that is greater than 100 Gb/s cannot be placed on the lower bandwidth links (e.g., 100 Gb/s), i.e., they have to take advantage of the higher bandwidth links.

However, when lower bandwidth LSPs (existing or new) are created or reoptimized, it is seen that they have a tendency to utilize the higher bandwidth links, leading to a result that when large capacity LSPs are created or upsized, they are not able to take advantage of higher bandwidth links which are already occupied with smaller bandwidth LSPs.

Also, LSP auto-sizing allows for given LSP tunnels to change in bandwidth. LSP auto-sizing works as follows—

An LSP is configured with a minimum size (min-size), increment-size (how much the LSP tunnel can change at a time, and maximum size (max-size)

The LSP is initially established with min-size bandwidth

The headend keeps track of utilization and when utilization exceeds a threshold, it upsizes the existing LSP with the "increment-size" bandwidth This continues until max-size, after which traffic is dropped The auto-size scheme plays into the aforementioned preemption problem in following way—

Since the LSP is established with min-size, it can be placed on any links that have the available bandwidth.

During upsizing, they can move and may shift towards higher bandwidth links

This also applies to large bandwidth LSPs (>100G), they start with minimum but can expand to 300G, for example,—so it is not known a priori that it should be placed on higher bandwidth links from the beginning.

There is a need for a mechanism to

Allow growing tunnels (Upsize) to potentially pre-empt smaller tunnels for which finding suitable paths is easier. That is, it is much easier to find a path for lower bandwidth tunnels (e.g., 10 Gb/s, etc.) versus high bandwidth tunnels (e.g., >100 Gb/s).

Ensure large tunnels potentially pre-empt smaller tunnels when they need to reroute/redial, again under the assumption that it is much easier to find alternate routes for smaller tunnels than for larger tunnels.

Of note, the terms lower and higher (or low and high) are relative terms, but those skilled in the art will recognize these terms are defined with reference to the underlay network (optical network). For example, 10G, 40G, etc. tunnels have low bandwidth on optical links at 100G and beyond, i.e., there are opportunities to find alternative paths. Conversely, a 100G tunnel has high bandwidth on optical links at 100G, etc. That is, we are defining the terms high and low in context with the possibility to find an alternative route in the network. A 200G tunnel cannot work at full rate on 100G optical links, so the variable preemption described herein wants to make it such that the 200G tunnel can preempt 100G or less tunnels on 200G or higher optical links. That is, the comparison is in context with the bandwidth on the underlay network.

In general, the present disclosure includes different setup and hold priority values based on various criteria; such as current size (i.e. bandwidth needs) of an LSP, number of failed attempts to establish the LSP, combination of both, etc. The intent is to use variable setup and hold priorities based on the user configured parameters/rules. One use case is to increase/decrease setup and hold priority based on the upsizing and downsizing of the LSP tunnel bandwidth. The idea here is a large bandwidth LSP needs to be able to preempt smaller bandwidth LSPs on a higher bandwidth link or the large bandwidth LSP needs to be able to continue to remain on a higher bandwidth link. This is referred to as variable preemption for label-switched paths (LSP) tunnels, namely the setup and hold priority values are not static, but are based on the current bandwidth of the tunnel. That is, the variability can be a function of LSP tunnel bandwidth and/or underlay network link bandwidth.

In an embodiment, expanding on example use case where use of dynamic priority is tied to bandwidth, this approach allows configuration of a large LSP (>100G) with incremental/different setup and hold priority values applicable at different bandwidth thresholds, such as—

Setup Priority=A and Hold Priority=B, where B<=A, e.g.: Setup Priority=3 and Hold Priority=3

Bandwidth-threshold-1=80G, Setup Priority=C and Hold Priority=D, where D<=C and C<A and D<B, e.g.: Setup Priority=2 and Hold Priority=2

Bandwidth-threshold-2=90G, Setup Priority=E and Hold Priority=F, where F<=E and E<C and F<D, e.g. Setup Priority=1 and Hold Priority=1

Bandwidth-threshold-3=100G, Setup Priority=G and Hold Priority=H, where H<=G and G<E and H<F, e.g. Setup Priority=0 and Hold Priority=0

Such configuration above means:

LSP will be initially created with Setup Priority=A and Hold Priority=B.

When LSP grows in size above 80G but not above 90G then its priorities will be upgraded to Setup Priority=C and Hold Priority=D When LSP shrinks in size below 80G then then its priorities will be downgraded to Setup Priority=A and Hold Priority=B When LSP grows in size above 90G but not above 100G then its priorities will be upgraded to Setup Priority=E and Hold Priority=F When LSP shrinks in size below 90G but not below 80G then its priorities will be downgraded to Setup Priority=C and Hold Priority=D When LSP grows in size above 100G then its priorities will be upgraded to Setup Priority=G and Hold Priority=H When LSP shrinks in size below 100G but not below 90G then its priorities will be downgraded to Setup Priority=E and Hold Priority=F Similarly, an example of use of dynamic priority for a given failed LSP signaling while attempting to redial includes—

Failed attempt=3, setup-priority and hold priority value is decreased by one (meaning priority is increased)

Failed attempt=6, setup-priority and hold priority value is decreased by one (meaning priority is increased)

and this continues until it reaches the highest priority.

This scheme will allow displacing the lower priority low bandwidth LSP away from higher capacity links as and when the large LSP grows as the utilization increases. Again, the goal is for higher bandwidth tunnels to be able to preempt bandwidth on higher bandwidth underly tunnel links.

The proposal is to automatically adjust tunnel's priority as it grows (Upsizes) and/or based on a particular underlay link. For example, when a tunnel reaches some threshold size, e.g.: 50G (or some other possibly configurable value), then its Setup and Holding Priority is upgraded from its current Setup=Holding=5 to Setup=Holding=4. It is also possible to define multiple threshold sizes and multiple upgrades, e.g., at 30G upgrade from Setup=Holding=5 to Setup=Holding=4, and at 60G upgrade from Setup=Holding=4 to Setup=Holding=3.

Automatic tunnel priority adjustment can be accomplished via MBB, i.e., perform MBB operation to upgrade from Setup=Holding=5 to Setup=Holding=4. Note that Setup and Holding Priorities need not be the same, e.g.: Setup=5 and Holding=3 is a valid combination, but for clarity and practicality the mechanism is described with Setup=Holding but upgrading either Setup and/or Holding Priority can be considered and is contemplated herewith. Practicality the mechanism is described with Setup=Holding but upgrading either Setup and optionally Holding Priority can be also considered, but the rule of Holding Priority being no worse (numerically higher) than Setup Priority must hold.

When a tunnel shrinks in size, then its priority can be degraded accordingly. For example, when a tunnel was upgraded from Setup=Holding=5 to Setup=Holding=4 upon reaching 50G, it is downgraded to Setup=Holding=5 via MBB when its size drops below 50G. It is also possible to consider using different Upgrade and Downgrade thresholds to control oscillations when tunnel's size hovers around the threshold value, e.g.: upgrade at 50G but downgrade at 40G.

Upgrading a tunnel's priority makes that tunnel more important. Importance is defined as the ability to grow and ability to find suitable routes during re-route/redial or MBB when tunnel is large. That is, our view of importance may not be the classical service provider view of Classes of Service, but rather importance is also a function of size. By upgrading tunnel's priority, the present disclosure ensures that large tunnels are able to grow at potential expense of pre-emptying smaller size tunnels which should find it easier to find suitable paths for themselves. Those skilled in the art will recognize the smaller size tunnels may have a higher priority from a customer perspective, but the present disclosure assumes these smaller size tunnels will be able to get resources elsewhere, including via preemption. The problem addressed with the variable priority values is higher bandwidth tunnels may not be able to find a path.

This idea can also apply to "dynamic increasing of Setup Priority and (may be not) Holding Priority. Here, regular LSP (not Large LSP), will initially establish with default Setup and Holding Priority. If they fail to establish, simply because there is no available bandwidth in the network, LSP establishment would fail. RSVP will retry in incremental backoff way to see if bandwidth has become available and LSP can be re-established. Here, we can (based on user configuration whether to apply increased Setup/Holding priority) apply Setup/Holding priority increments, during retried and failed threshold (for example, three failed attempts, increase the priority, six failed attempts increase the priority even higher, etc.) keep increasing the priority until it succeeds.

Figure 11:
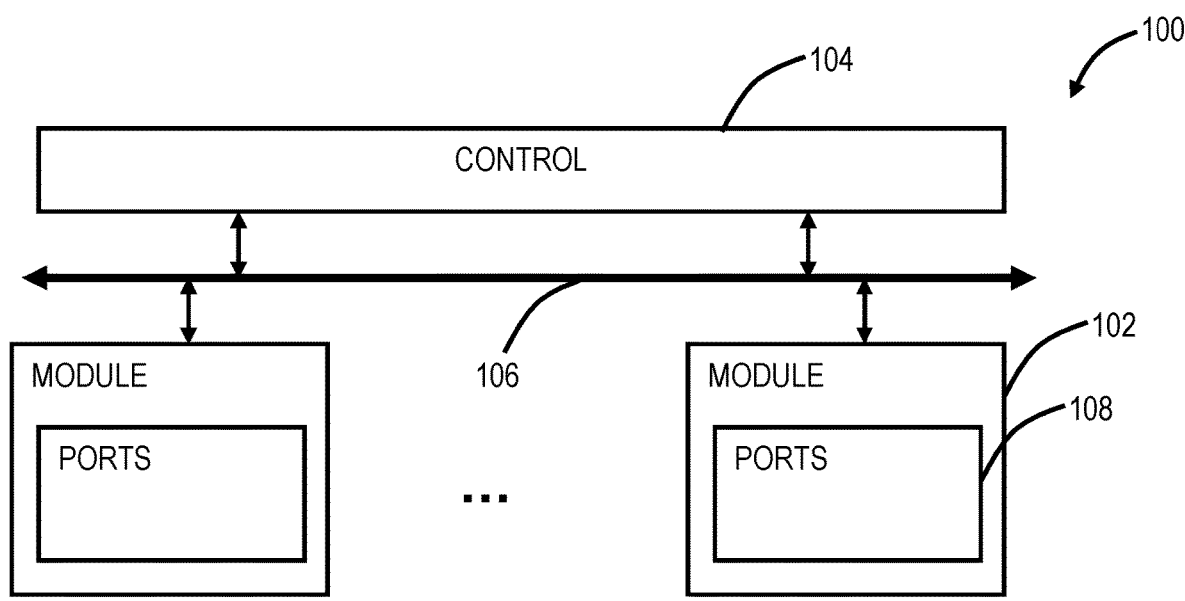
FIG. 11 is a block diagram of an example implementation of a node.

FIGS. 1-9 are network diagrams of an example MPLS network 10 illustrating LSP tunnel operation over time as various tunnels resize, reroute, redial, and/or perform MBB. For illustration purposes, the MPLS network 10 includes three nodes A, B, C, and three links, link A-B, B-C, A-C (FIG. 1). The nodes A, B, C can be referred to as network elements, routers, switches, etc. An example implementation of the nodes A, B, C is illustrated in FIG. 11. In an embodiment, the nodes A, B, C can be routers or switches having coherent optical modems, e.g., 100G, 200G, etc. to form the links. In another embodiment, the nodes A, B, C can be routers or switches that connect to a separate Dense Wavelength Division Multiplexing (DWDM) platform. Those skilled in the art will recognize any such physical implementation is contemplated. The key aspect here is a value of optical bandwidth on the links, e.g., the links A-B, B-C are 100G and the link A-C is 200G, merely for illustration purposes, and the value of LSP tunnels created via the nodes A, B, C.

The MPLS network 10 is provisioned on top on an underlay network which can be an optical network (DWDM), optical transport network (OTN), segment routing (SR), combinations thereof, and the like. In FIGS. 1-9, the underlay network is shown by the links A-B, B-C, A-C and the corresponding bandwidth values listed, i.e., 100G or 200G. Again, this is merely for illustration purposes. The present disclosure contemplates any underlay network relative to the MPLS network 10. The underlay network is a lower layer network on which the MPLS network 10 operates.

Figure 2:
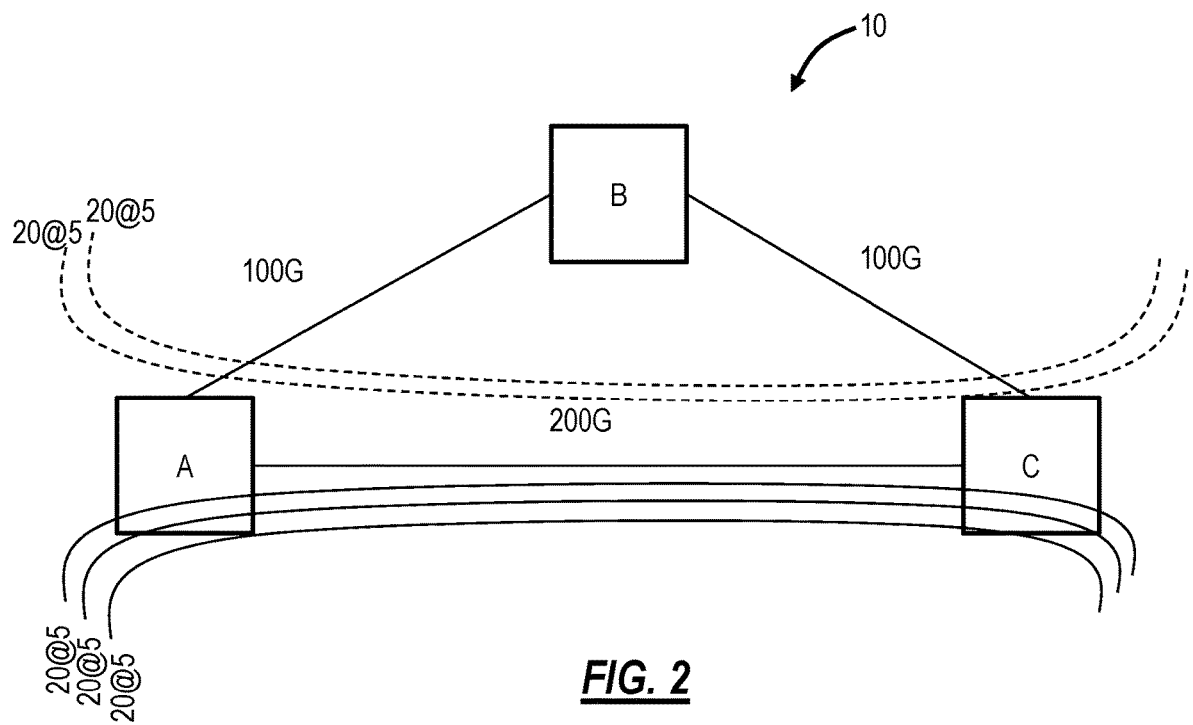

All LSPs in this example are from node A to node C. In FIG. 2, 5 LSPs are configured, each having a min-bandwidth of 20G and a priority of 5, i.e., the labels XX@Y show the bandwidth of X and the priority of Y. For illustration purposes, a single priority number is presented, assuming Setup and Holding Priority are equal; of course, this is not a requirement but merely shown for simplicity.

Figure 3:
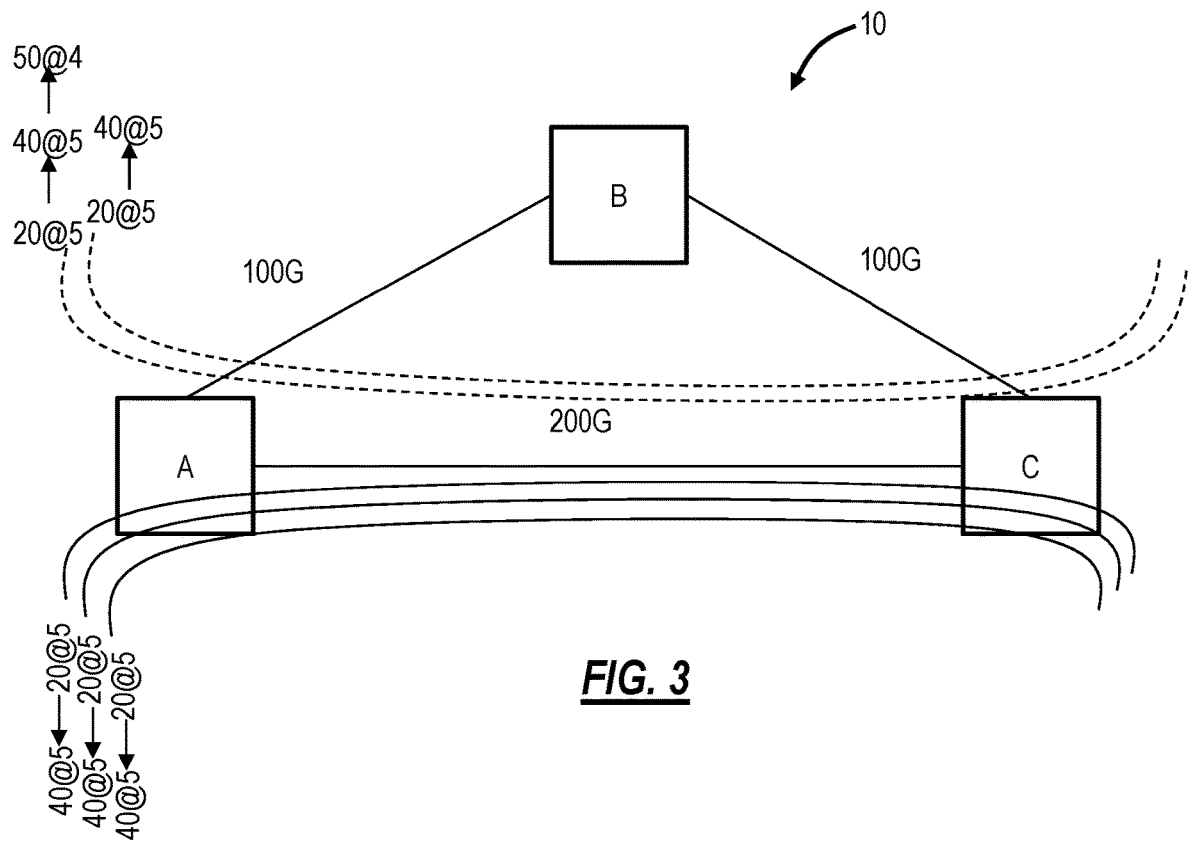
Figure 4:
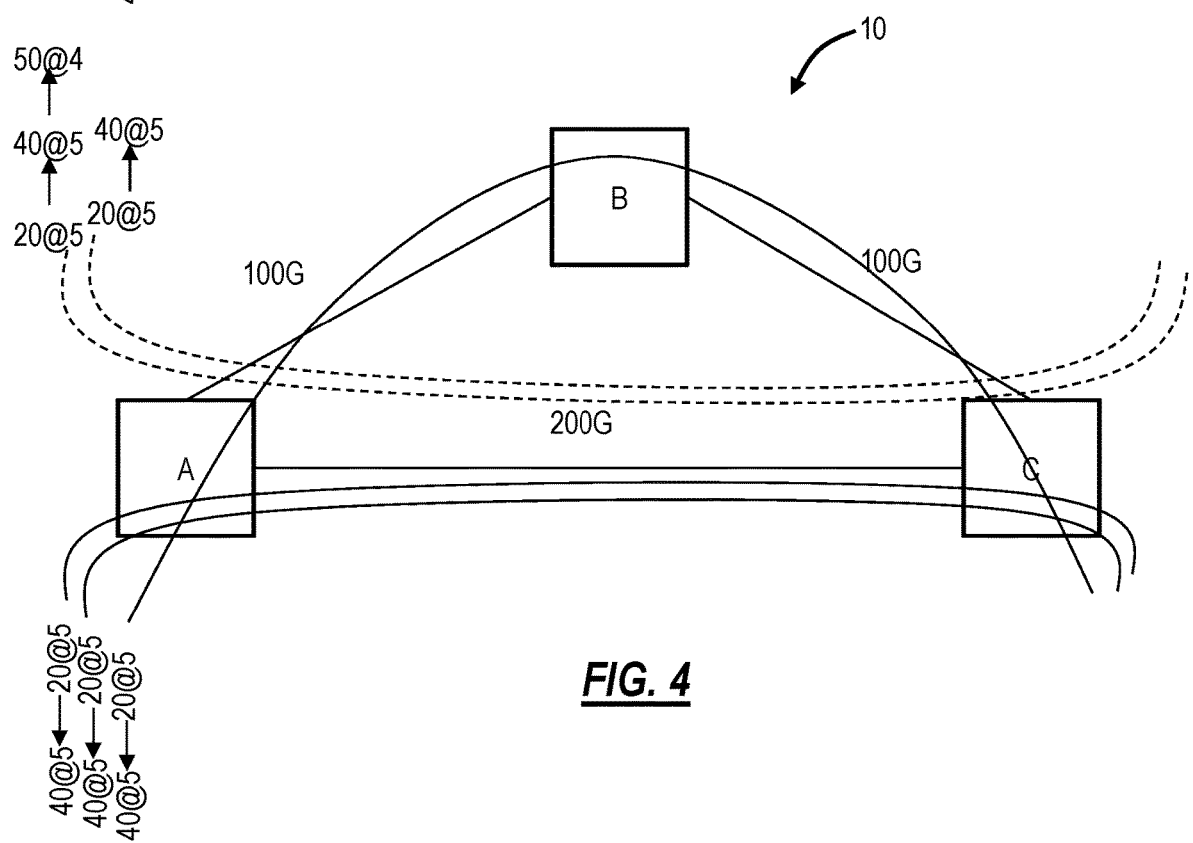
Figure 5:
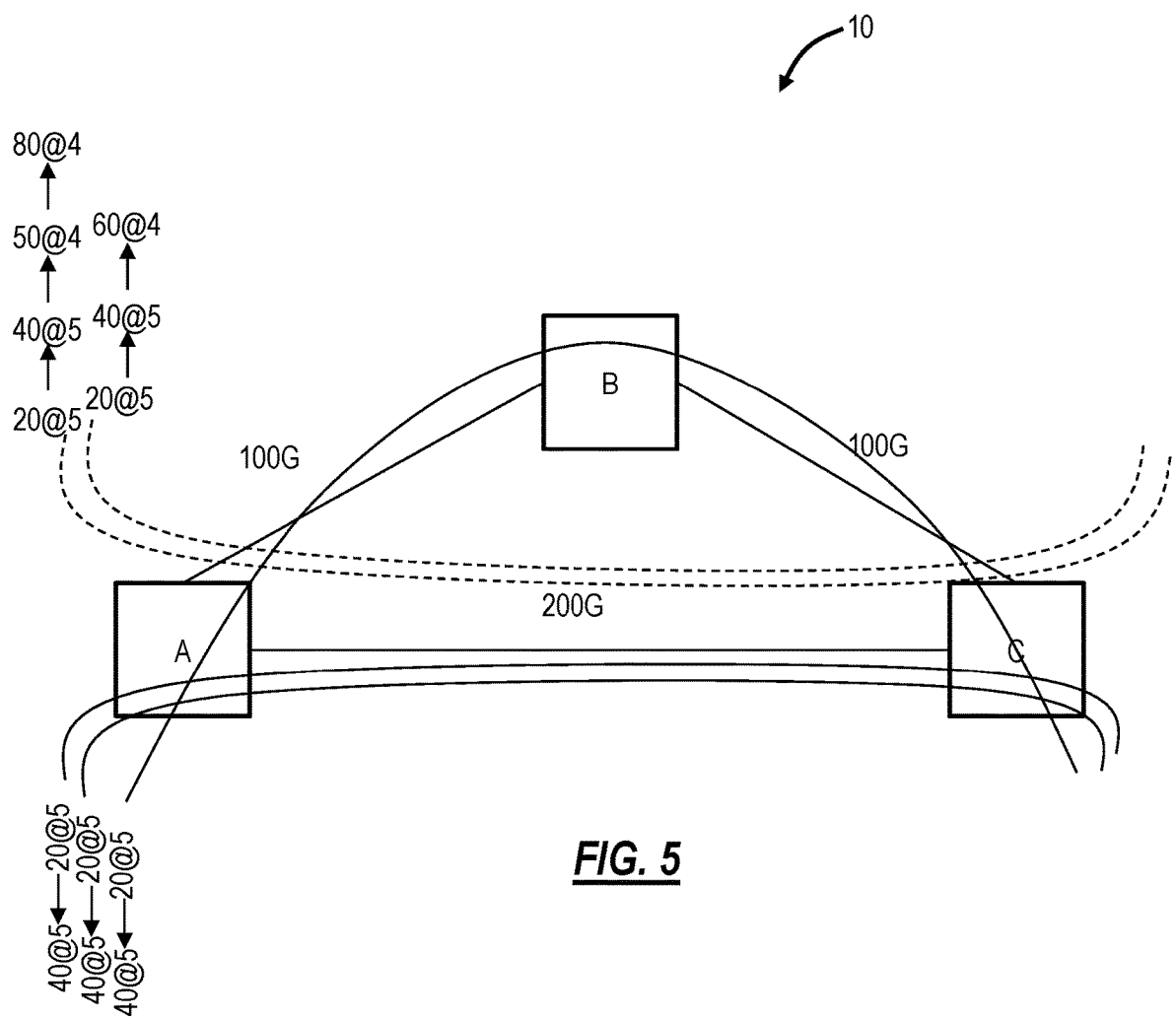
Figure 6:
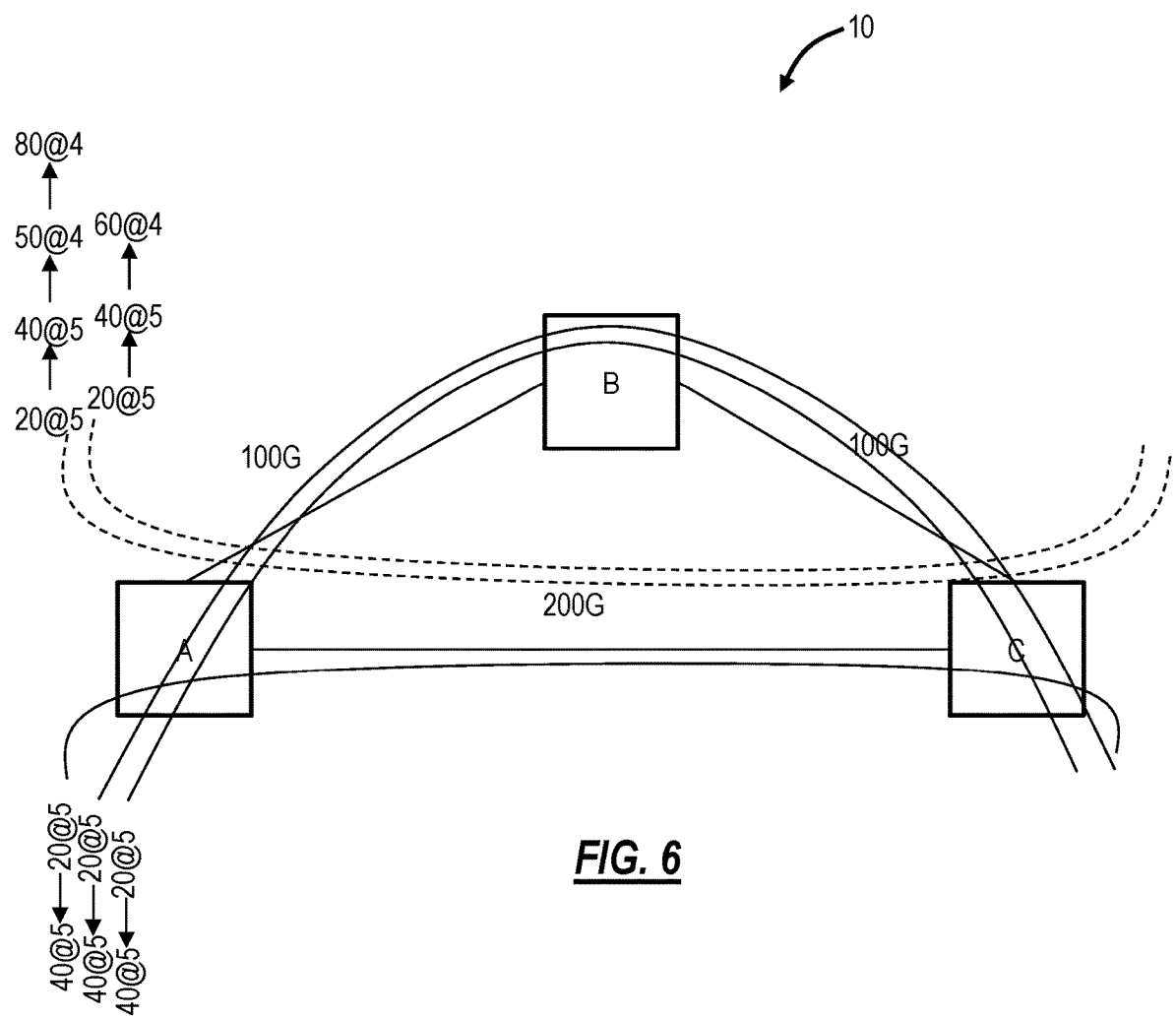
Figure 7:
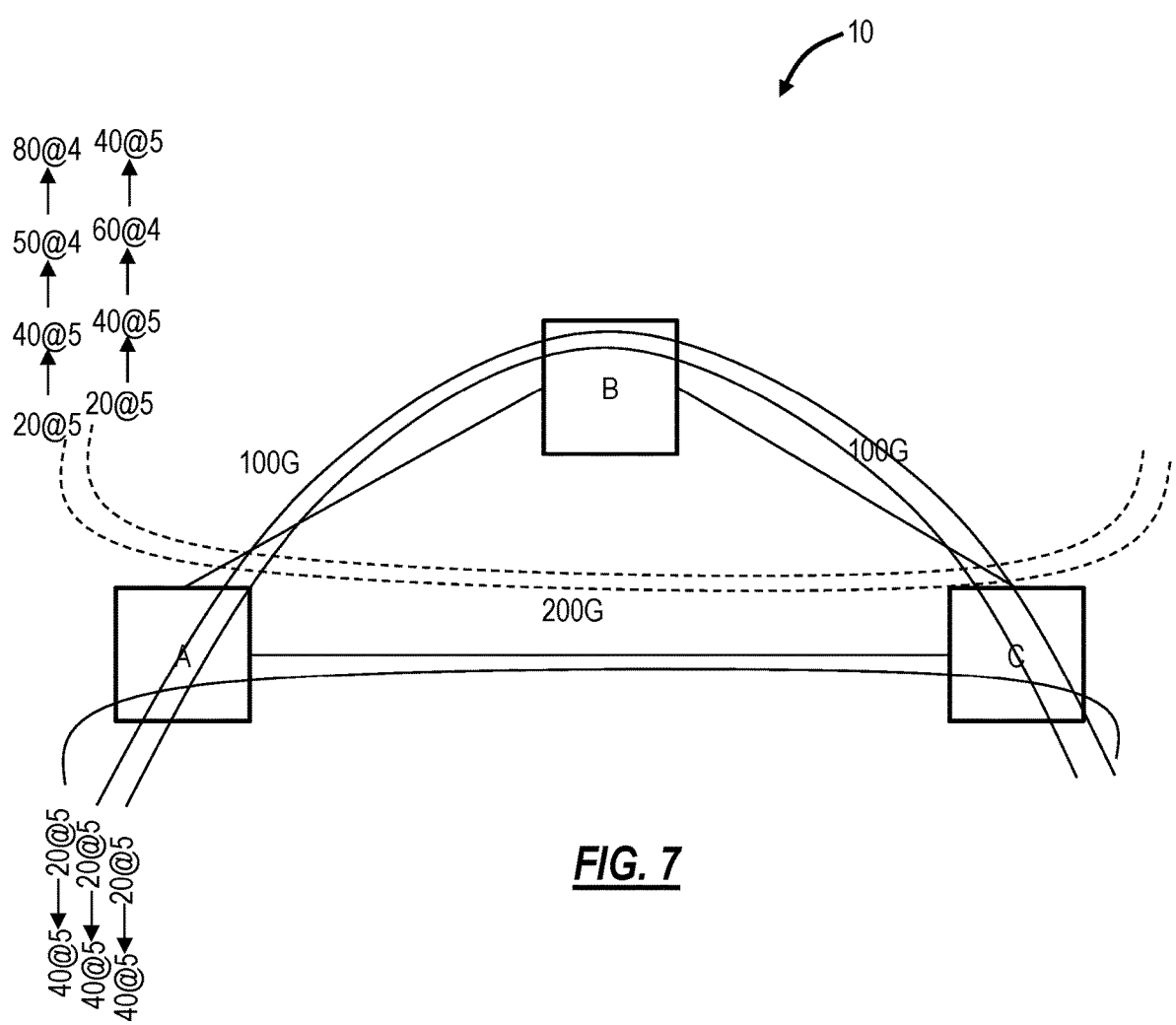
Figure 8:
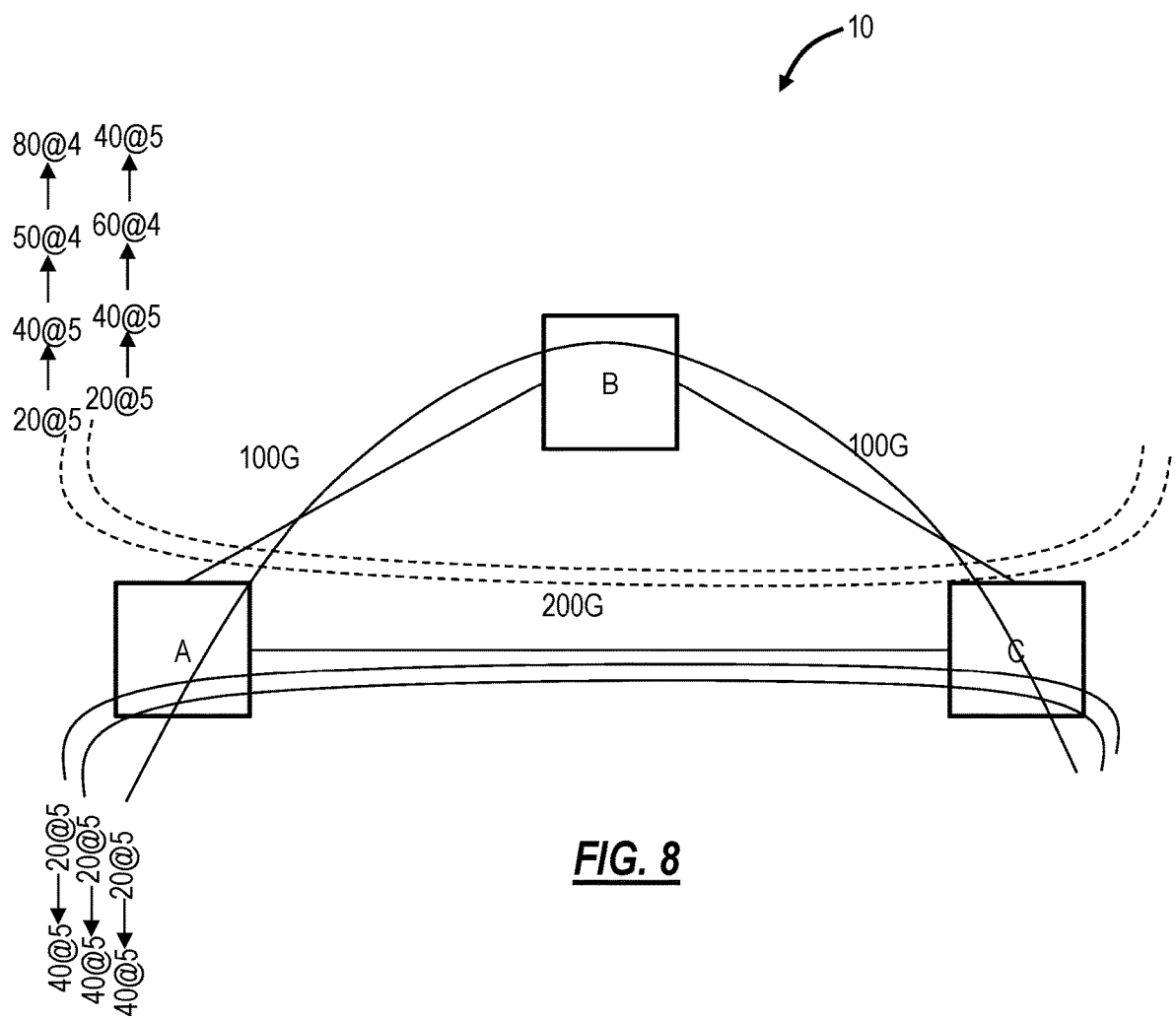
Figure 9:
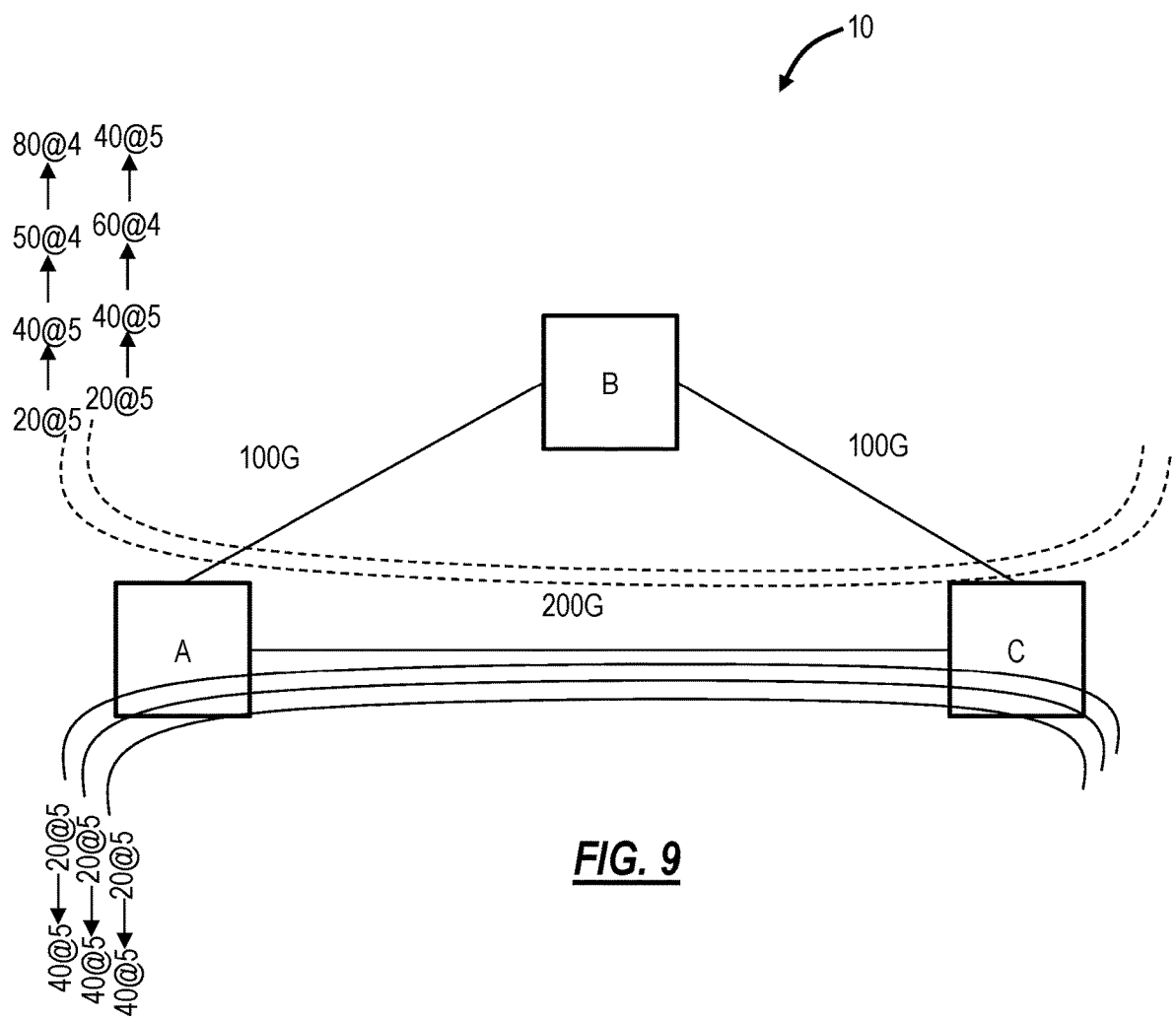

FIG. 3 illustrates some auto sizing from the min-bandwidth of 20G. For example, all LSP tunnels go from 20@5 (20G at priority 5) to 40@5, and one LSP tunnel goes from 40@5 to 50@4, i.e., at 50G, this LSP tunnel goes to higher priority of 4 versus 5. At this point, when the LSP tunnel goes to 50@4 (FIG. 4), there is a need for one of the LSPs to be pre-empted from the link A-C, since it only supports 200G. Note, all of the LSPs want to go on the link A-C since it is direct. In FIG. 5, there is further auto sizing higher, i.e., the LSP tunnel of 50@4 goes to 80@4 and another one at 40@5 goes to 60@4, leading to another LSP being pre-empted from the link A-C (FIG. 6). In FIG. 7, there is a reduction in bandwidth of one of the LSPs on the link A-C, from 60@4 to 40@5. Of note, the priority changes at a threshold of 50G, becoming higher priority above the threshold, and lower priority below the threshold. In FIG. 8, there is an optimization of one of the LSPs back to the link A-C. And finally, in FIG. 9, there is another optimization of one of the LSPs back to the link A-C.

Of note, this example shows the variable preemption priority based on the bandwidth value of the LSP tunnel, i.e., all priorities change at 50G, 100G, etc., i.e., in 50G increments. The variable preemption priority can also be based on the underlay network bandwidth, e.g., an LSP of 50G may have a certain priority on a 200G link, a different priority on a 100G link, etc.

Process of Variable Preemption

Figure 10:
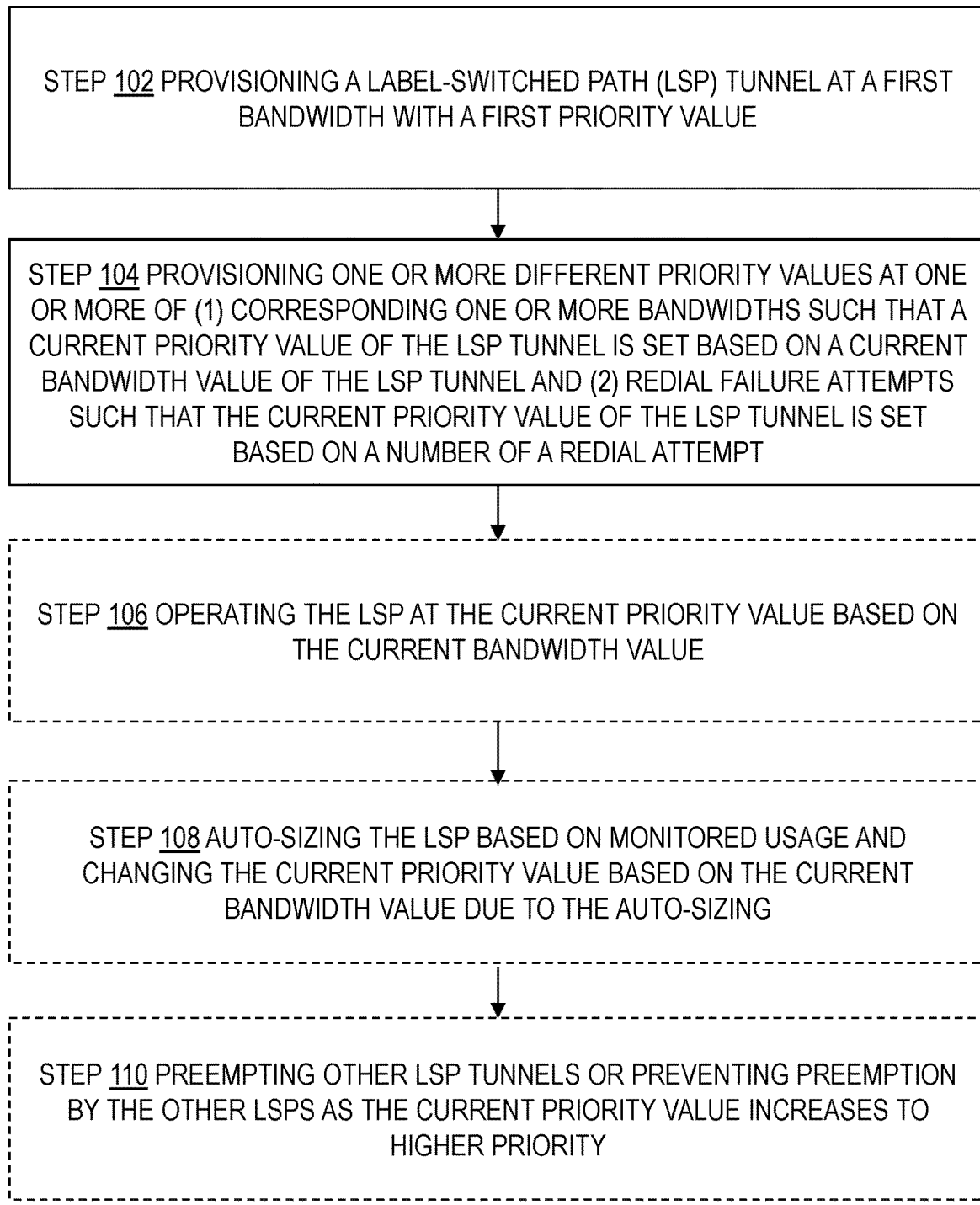
FIG. 10 is a flowchart of a process of variable preemption/priority for LSP tunnels.

FIG. 10 is a flowchart of a process 100 of variable preemption/priority for LSP tunnels. The process 100 contemplates implementation as a method having steps, a network element performing the steps, circuitry performing the steps, a processing device performing the steps, and as instructions stored in non-transitory computer-readable medium that, when executed, cause one or more processors to execute the steps. The process 100 can be implemented in a centralized node (e.g., management system, PCE, etc.) or a router (e.g., Label Edge Router).

The process 100 includes provisioning a label-switched path (LSP) tunnel at a first bandwidth with a first priority value (step 102); and provisioning one or more different priority values at one or more of (1) corresponding one or more bandwidths such that a current priority value of the LSP tunnel is set based on a current bandwidth value of the LSP tunnel and (2) redial failure attempts such that the current priority value of the LSP tunnel is set based on a number of a redial attempt (step 104). Note, the priority value can be set or adjusted based on bandwidth of the LSP tunnel, based on a number of redial failure attempts, as well as a combination thereof.

As described herein, the priority value can be the Setup priority, the Holding priority, or both. Also, configuration of thresholds can be for Upgrading as well as Downgrading, e.g., upgrade priority at 50G and downgrade priority at 40G The process 100 can include operating the LSP at the current priority value based on the current bandwidth value (106); auto-sizing the LSP based on monitored usage and changing the current priority value based on the current bandwidth value due to the auto-sizing (step 108); and preempting other LSP tunnels or preventing preemption by the other LSPs as the current priority value increases to higher priority (step 110).

The priority value can be for any of a Holding Priority, a Setup Priority, and a combination thereof.

The current bandwidth value is set to a higher priority value for a higher bandwidth value, thereby allowing the LSP tunnel to preempt smaller, lower priority LSP tunnels.

The one or more bandwidths can include a value in excess of 100 Gb/s.

Changing of the current priority value can include different Upgrade and Downgrade thresholds to control oscillations.

Example Node

FIG. 11 is a block diagram of an example implementation of a node 100. Those of ordinary skill in the art will recognize FIG. 11 is a functional diagram in an oversimplified manner, and a practical embodiment may include additional components and suitably configured processing logic to support known or conventional operating features that are not described in detail herein.

In an embodiment, the node 100 is a packet switch, but those of ordinary skill in the art will recognize the systems and methods described herein can operate with other types of network elements and other implementations that support SR networking. In this embodiment, the node 100 includes a plurality of modules 102, 104 interconnected via an interface 106. The modules 102, 104 are also known as blades, line cards, line modules, circuit packs, pluggable modules, etc. and generally refer to components mounted on a chassis, shelf, etc. of a data switching device, i.e., the node 100. Each of the modules 102, 104 can include numerous electronic devices and/or optical devices mounted on a circuit board along with various interconnects, including interfaces to the chassis, shelf, etc.

Two example modules are illustrated with line modules 102 and a control module 104. The line modules 102 include ports 108, such as a plurality of Ethernet ports. For example, the line module 102 can include a plurality of physical ports disposed on an exterior of the module 102 for receiving ingress/egress connections. Additionally, the line modules 102 can include switching components to form a switching fabric via the interface 106 between all of the ports 108, allowing data traffic to be switched/forwarded between the ports 108 on the various line modules 102. The switching fabric is a combination of hardware, software, firmware, etc. that moves data coming into the node 100 out by the correct port 108 to the next node 100. "Switching fabric" includes switching units in a node; integrated circuits contained in the switching units; and programming that allows switching paths to be controlled. Note, the switching fabric can be distributed on the modules 102, 104, in a separate module (not shown), integrated on the line module 102, or a combination thereof.

The control module 104 can include a microprocessor, memory, software, and a network interface. Specifically, the microprocessor, the memory, and the software can collectively control, configure, provision, monitor, etc. the node 100. The network interface may be utilized to communicate with an element manager, a network management system, the PCE 20, etc. Additionally, the control module 104 can include a database that tracks and maintains provisioning, configuration, operational data, and the like.

Again, those of ordinary skill in the art will recognize the node 100 can include other components which are omitted for illustration purposes, and that the systems and methods described herein are contemplated for use with a plurality of different network elements with the node 100 presented as an example type of network element. For example, in another embodiment, the node 100 may include corresponding functionality in a distributed fashion. In a further embodiment, the chassis and modules may be a single integrated unit, namely a rack-mounted shelf where the functionality of the modules 102, 104 is built-in, i.e., a "pizza-box" configuration. That is, FIG. 11 is meant to provide a functional view, and those of ordinary skill in the art will recognize actual hardware implementations may vary.

Example Controller

Figure 12:
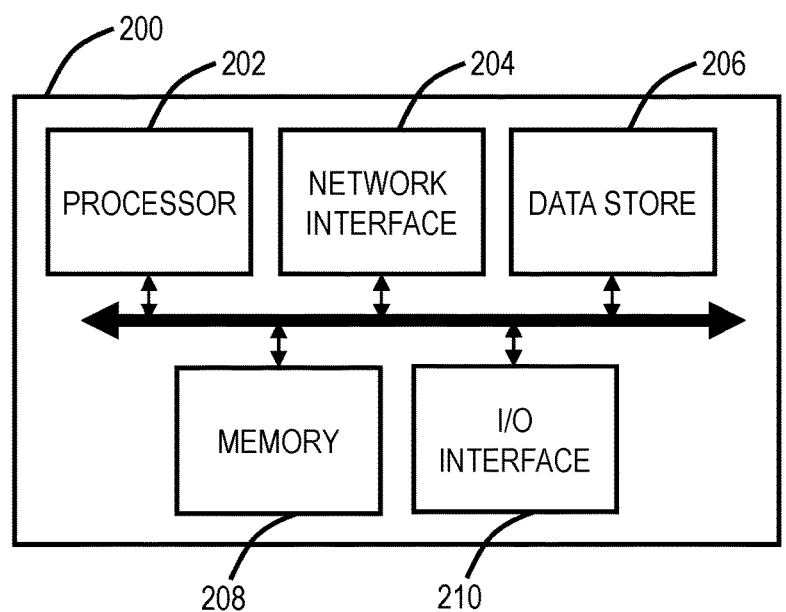
FIG. 12 is a block diagram of an example processing device, such as a controller for the node of FIG. 11.

FIG. 12 is a block diagram of an example processing device 200. The processing device 200 can be part of the network element, or a stand-alone device communicatively coupled to the network element. Also, the processing device 200 can be referred to in implementations as a control module, a shelf controller, a shelf processor, a system controller, etc. The processing device 200 can include a processor 202 which is a hardware device for executing software instructions. The processor 202 can be any custom made or commercially available processor, a central processing unit (CPU), an auxiliary processor among several processors associated with the processing device 200, a semiconductor-based microprocessor (in the form of a microchip or chipset), or generally any device for executing software instructions. When the processing device 200 is in operation, the processor 202 is configured to execute software stored within the memory, to communicate data to and from the memory, and to generally control operations of the processing device 200 pursuant to the software instructions. The processing device 200 can also include a network interface 204, a data store 206, memory 208, an I/O interface 210, and the like, all of which are communicatively coupled to one another and to the processor 202.

The network interface 204 can be used to enable the processing device 200 to communicate on a data communication network, such as to communicate to a management system, to the nodes 12, the like. The network interface 204 can include, for example, an Ethernet module. The network interface 204 can include address, control, and/or data connections to enable appropriate communications on the network. The data store 206 can be used to store data, such as control plane information, provisioning data, Operations, Administration, Maintenance, and Provisioning (OAM&P) data, etc. The data store 206 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 206 can incorporate electronic, magnetic, optical, and/or other types of storage media. The memory 208 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 208 may incorporate electronic, magnetic, optical, and/or other types of storage media. Note that the memory 208 can have a distributed architecture, where various components are situated remotely from one another, but may be accessed by the processor 202. The I/O interface 210 includes components for the processing device 200 to communicate with other devices.

CONCLUSION

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A non-transitory computer-readable medium comprising instructions that, when executed, cause at least one processor to perform steps of:
    provisioning a label-switched path (LSP) tunnel at a first bandwidth with a first priority value;
    provisioning one or more different priority values for the LSP tunnel, wherein the one or more different priority values change a current priority value for the LSP tunnel based on one or more of (1) corresponding one or more bandwidths of the LSP tunnel such that the current priority value of the LSP tunnel is set based on a current bandwidth value of the LSP tunnel and (2) redial failure attempts such that the current priority value of the LSP tunnel is set based on a number of the redial failure attempts;
    operating the LSP tunnel at the first priority on the first bandwidth, and
    in response to auto-sizing the LSP tunnel based on monitored usage, changing the first priority value due to the auto-sizing, to a second priority value.

2. The non-transitory computer-readable medium of claim 1, wherein the priority values include one of a Setup Priority, a Holding Priority, and a combination thereof.

3. The non-transitory computer-readable medium of claim 1, wherein the steps further include
    detecting one or more of the current bandwidth value of the LSP tunnel and the number of the redial attempts, and setting the current priority value of the LSP tunnel based thereon.

4. The non-transitory computer-readable medium of claim 1, wherein the corresponding one or more bandwidths are based on a threshold of bandwidth.

5. The non-transitory computer-readable medium of claim 1, wherein the steps further include
    preempting other LSP tunnels or preventing preemption by the other LSP tunnels based on the second priority value.

6. The non-transitory computer-readable medium of claim 1, wherein the current bandwidth value causes a setting to a higher priority value for a higher bandwidth value, thereby allowing the LSP tunnel to preempt a lower priority LSP tunnel.

7. The non-transitory computer-readable medium of claim 1, wherein the current bandwidth value includes different Upgrade and Downgrade thresholds to control oscillations.

8. The non-transitory computer-readable medium of claim 1, wherein the LSP tunnel is configured over an underlay network comprising one of an optical network, an optical transport network (OTN), a segment routing (SR) network, and a combinations thereof.

9. The non-transitory computer-readable medium of claim 8, wherein the current priority value of the LSP tunnel is set based on bandwidth on given links in the underlay network.

10. An apparatus comprising:
    one or more processors; and
    memory storing instructions that, when executed, cause the one or more processors to
        cause provisioning of a label-switched path (LSP) tunnel at a first bandwidth with a first priority value,
        cause provisioning of one or more different priority values for the LSP tunnel, wherein the one or more different priority values change a current priority value for the LSP tunnel based on one or more of (1) corresponding one or more bandwidths of the LSP tunnel such that the current priority value of the LSP tunnel is set based on a current bandwidth value of the LSP tunnel and (2) redial failure attempts such that the current priority value of the LSP tunnel is set based on a number of the redial failure attempts;
        responsive to operating the LSP tunnel at the first priority value based on the first bandwidth and auto-sizing of the LSP tunnel based on monitored usage, changing the first priority value due to the auto-sizing, to a second priority value.

11. The apparatus of claim 10, wherein the priority values include one of a Setup Priority, a Holding Priority, and a combination thereof.

12. The apparatus of claim 10, wherein the instructions that, when executed, further cause the one or more processors to
    detect one or more of the current bandwidth value of the LSP tunnel and the number of the redial attempts, and set the current priority value of the LSP tunnel based thereon.

13. The apparatus of claim 10, wherein the corresponding one or more bandwidths are based on a threshold of bandwidth.

14. The apparatus of claim 10, wherein the current bandwidth value causes a setting to a higher priority value for a higher bandwidth value, thereby allowing the LSP tunnel to preempt lower a priority LSP tunnel.

15. The apparatus of claim 10, wherein the current bandwidth value includes different Upgrade and Downgrade thresholds to control oscillations.

16. The apparatus of claim 10, wherein the LSP tunnel is configured over an underlay network comprising one of an optical network, an optical transport network (OTN), a segment routing (SR) network, and a combinations thereof.

17. A method comprising steps of:
provisioning a label-switched path (LSP) tunnel at a first bandwidth with a first priority value;
provisioning one or more different priority values for the LSP tunnel, wherein the one or more different priority values change a current priority value for the LSP tunnel based on one or more of (1) corresponding one or more bandwidths of the LSP tunnel such that the current priority value of the LSP tunnel is set based on a current bandwidth value of the LSP tunnel and (2) redial failure attempts such that the current priority value of the LSP tunnel is set based on a number of the redial failure attempts;
operating the LSP tunnel at the first priority value based on the first bandwidth, and
in response to auto-sizing the LSP tunnel based on monitored usage, changing the first priority value due to the auto-sizing, to a second priority value.

18. The method of claim 17, wherein the steps further include
preempting other LSP tunnels or preventing preemption by the other LSP tunnels based on the second priority value.

* * * * *